United States Patent
De La Gorgue De Rosny et al.

(10) Patent No.: US 10,516,215 B2
(45) Date of Patent: Dec. 24, 2019

(54) METHOD FOR GENERATING HIGH-POWER ELECTROMAGNETIC RADIATION

(71) Applicant: CENTRE NATIONAL DE LA RECHERCHE SCIENTIFIQUE—CNRS, Paris (FR)

(72) Inventors: Julien De La Gorgue De Rosny, Nogent sur Marne (FR); Mathias Fink, Meudon (FR); Arnaud Tourin, Sevres (FR); Geoffroy Lerosey, Paris (FR); Matthieu Dupre, Paris (FR)

(73) Assignee: CENTRE NATIONAL DE LA RECHERCHE SCIENTIFIQUE-CNRS, Paris (FR)

( * ) Notice: Subject to any disclaimer, the term of this patent is extended or adjusted under 35 U.S.C. 154(b) by 325 days.

(21) Appl. No.: 15/517,506

(22) PCT Filed: Oct. 7, 2015

(86) PCT No.: PCT/FR2015/052700
§ 371 (c)(1),
(2) Date: Apr. 6, 2017

(87) PCT Pub. No.: WO2016/055736
PCT Pub. Date: Apr. 14, 2016

(65) Prior Publication Data
US 2017/0310015 A1    Oct. 26, 2017

(30) Foreign Application Priority Data

Oct. 9, 2014   (FR) ..................................... 14 02273

(51) Int. Cl.
*H01Q 13/18*    (2006.01)
*H01Q 3/00*    (2006.01)
(Continued)

(52) U.S. Cl.
CPC ............. *H01Q 13/18* (2013.01); *G01S 13/06* (2013.01); *G01S 13/86* (2013.01); *H01Q 3/00* (2013.01);
(Continued)

(58) Field of Classification Search
CPC ...... H01Q 13/18; H01Q 3/00; H01Q 21/0018; H01Q 21/064; G01S 13/06; G01S 13/86
See application file for complete search history.

(56) References Cited

U.S. PATENT DOCUMENTS 2,471,419 A * 5/1949 Edson .................. G01S 7/4052
                                                                          333/233
3,597,691 A * 8/1971 Robin ..................... H01J 23/36
                                                                          455/108
(Continued)

FOREIGN PATENT DOCUMENTS

FR    2985384 A1    7/2013
FR    2985386 A1 *  7/2013 ............. H01Q 3/267
WO    WO-2013182800 A2    12/2013

OTHER PUBLICATIONS

International Search Report for International Application No. PCT/FR2015/052700, dated Feb. 16, 2016.
(Continued)

*Primary Examiner* — Peter M Bythrow
(74) *Attorney, Agent, or Firm* — Marshall, Gerstein & Borun LLP

(57) ABSTRACT

The invention relates to a method and a device for generating high-power electromagnetic radiation. A transmission antenna of a transmission device capable of emitting an electromagnetic transmission wave is arranged in a reverberation cavity comprising openings. The method includes determining an electromagnetic temporal waveform F focused in a desired direction of focus outside the cavity;
(Continued)

and emitting an electromagnetic transmission wave E having temporal waveform F into the cavity using the transmission device.

15 Claims, 2 Drawing Sheets

(51) Int. Cl.
  *H01Q 21/00* (2006.01)
  *H01Q 21/06* (2006.01)
  *G01S 13/06* (2006.01)
  *G01S 13/86* (2006.01)

(52) U.S. Cl.
  CPC ....... *H01Q 21/0018* (2013.01); *H01Q 21/064* (2013.01)

(56) References Cited

U.S. PATENT DOCUMENTS

| | | | | |
|---|---|---|---|---|
| 4,691,206 A * | 9/1987 | Shapter | ........... | H01Q 13/18 343/700 MS |
| 4,733,245 A * | 3/1988 | Mussler | ........... | H01Q 19/09 343/769 |
| 5,202,697 A * | 4/1993 | Bonebright | ........... | H01Q 3/24 343/708 |
| 5,512,906 A * | 4/1996 | Speciale | ........... | H01Q 13/18 342/375 |
| 5,821,897 A * | 10/1998 | Bradley | ........... | G01S 7/4052 342/165 |
| 6,023,203 A * | 2/2000 | Parish | ........... | H01P 5/12 324/628 |
| 6,429,825 B1 * | 8/2002 | Martek | ........... | H01Q 13/18 343/770 |
| 6,452,549 B1 * | 9/2002 | Lo | ........... | H01Q 9/28 343/700 MS |
| 2003/0036674 A1 * | 2/2003 | Bouton | ........... | A61B 5/05 600/12 |
| 2003/0210195 A1 * | 11/2003 | Hager | ........... | G01S 7/03 343/770 |
| 2004/0004576 A1 * | 1/2004 | Anderson | ........... | H01Q 13/106 343/770 |
| 2012/0187833 A1 * | 7/2012 | Brasile | ........... | H01J 23/05 315/39.55 |
| 2012/0200223 A1 * | 8/2012 | Brasile | ........... | H01J 23/213 315/39.61 |
| 2013/0234878 A1 * | 9/2013 | Kemkemian | ........... | G01S 7/36 342/18 |
| 2015/0151141 A1 * | 6/2015 | Arnal | ........... | B06B 3/04 181/177 |
| 2016/0079677 A1 * | 3/2016 | Denis | ........... | B23K 9/095 228/18 |
| 2016/0104944 A1 * | 4/2016 | Rajagopalan | ........... | H01Q 9/42 343/725 |

OTHER PUBLICATIONS

Maldonado et al, Generation of very high pressure pulses with 1-bit time reversal in a solid waveguide, The Journal of the Acoustical Society of America, vol. 110, pp. 2849-2857, 2001.

Davy et al, Focusing and amplification of electromagnetic waves by time reversal in an leaky reverberation chamber, Comptes Rendus de Physique de l'Académie des Sciences vol. 11, pp. 37-43 of Feb. 18, 2010.

* cited by examiner

METHOD FOR GENERATING HIGH-POWER ELECTROMAGNETIC RADIATION

CROSS REFERENCE TO RELATED APPLICATIONS

This application is the U.S. National Phase of PCT Application No. PCT/FR2015/052700 filed Oct. 7, 2015, which claims the benefit of priority of French Patent Application No. 1402273 filed Oct. 9, 2014, the respective disclosures of which are each incorporated herein by reference in their entireties.

FIELD OF THE INVENTION

The present invention relates to the generation of high-power electromagnetic radiation.

More particularly, the invention relates to methods and devices for the generation of such electromagnetic radiation. The invention relates in particular to methods and devices for generating high-intensity electromagnetic waves in a direction of focus or at a desired point of focus.

BACKGROUND OF THE INVENTION

For decades, there have been known devices for generating high-power electromagnetic radiation using electron beams propagating in one or more vacuum tubes.

The most commonly used of these devices are klystrons, magnetrons, backward wave tubes, or traveling wave tubes, which are used for example to generate high-intensity radar beams.

These devices have numerous disadvantages.

In particular, they consume large amounts of energy and remain bulky and fragile due to the presence of the vacuum tubes.

It has also been proposed to apply time reversal methods in order to amplify electromagnetic pulses (for example, see "Generation of very high pressure pulses with 1-bit time reversal in a solid waveguide" by G. Montaldo, P. Roux, A. Deride, C. Negreira, and M. Fink, published in The Journal of the Acoustical Society of America, vol. 110, pp. 2849-2857, 2001).

More particularly, a waveguide is provided that is open at one end (front) and closed off at the other end (rear) by a wall comprising a plurality of piezoelectric transducers.

A pulse is generated at a target point outside the waveguide and propagates into the waveguide by the open front end. Signals are thus captured by the transducers inside the guide, at the rear end, and are representative of the field resulting from propagation of the wave in the waveguide. Because of reverberation on walls of the waveguide, these signals thus have significant temporal spread, for example on the order of 1000 times the duration of the initial pulse. A signal corresponding to the time-reversed signal received is then re-emitted by means of the transducers.

The pulse thus generated has remarkable temporal compression at the target point, and by comparing the signal obtained at the target point with that which would have been obtained without the waveguide (for example when emitted in open water), remarkable gains have been measured (for example on the order of fifteen). The effects of spatial and temporal compression thus provide a pulse of high amplitude.

Such a device thus allows obtaining high-power waves while providing a reduction in weight and an improved sturdiness compared to conventional devices for microwave generation as described above.

However, such a device and such a method have disadvantages. For UHF waves, waveguide has disadvantage of being large in size.

To reduce this size, it has recently been proposed to replace the waveguide by a reverberation cavity able to accommodate a large number of reflections of an electromagnetic wave propagating inside the cavity, as is described for example in "Focusing and amplification of electromagnetic waves by time reversal in a leaky reverberation chamber" by Matthieu Davy, Julien de Rosny, Jean-Christophe Joly and Mathias Fink, published in Comptes Rendus de Physique de l'Acadèmdie des Sciences volume 11, pages 37-43 of 18 Feb. 2010. Such a cavity always has a front opening for emission of the electromagnetic wave. However, for the cavity to enable the implementation of time-reversal techniques, it is necessary to limit the dimensions of the opening in order to maintain sufficiently high quality factor for the cavity.

Therefore, the width of the focal zone obtained at the target point cannot be reduced (diffraction requires enlarging the size of the opening to reduce the focal zone to the target point). In addition, the limited size of the opening also imposes constraints on the angular range which can be covered by the electromagnetic beam emitted.

The present invention is intended to overcome these disadvantages.

Thus, the present invention aims to provide a method and a device for generating high-power electromagnetic radiation, having a reduced size, greater sturdiness, and high reliability, while providing a greater focus and a large angular range.

OBJECTS OF THE INVENTION

To this end, the invention firstly relates to method for generating high-power electromagnetic radiation, wherein
  a reverberation cavity is provided having a plurality of openings and in which is arranged at least one transmission antenna of a transmission device capable of emitting an electromagnetic transmission wave,
  an electromagnetic temporal waveform F focused in a desired direction of focus outside the cavity is determined, and
  an electromagnetic transmission wave E having said temporal waveform F is emitted in the cavity by means of the transmission device.

In preferred embodiments of the invention, use may be made of one or more of: the following arrangements:
  in order to determine the electromagnetic temporal waveform F:
  a receiving antenna is provided outside the cavity in the desired direction of focus,
  a wideband electromagnetic calibration wave C is emitted in the cavity by means of the transmission device,
  a time series S of electrical signal values representative of the electromagnetic field generated by the electromagnetic calibration wave C at the location of the receiving antenna is acquired by means of the receiving antenna, and
  the electromagnetic temporal waveform F is determined from said time series S;
    the electromagnetic calibration wave C has a passband width greater than the inverse of a decay time in the cavity, preferably greater than twice the inverse of said decay time;

the electromagnetic temporal waveform F comprises elements selected from the electromagnetic wave phase values and one of the electromagnetic wave amplitude values;

the temporal waveform F is determined from the time series S by applying a method selected from: a time reversal method, a 1-bit time reversal method, and a baseband time reversal method;

a plurality of electromagnetic temporal waveforms F respectively focused in a plurality of directions of focus $\theta_i$ outside the cavity are determined;

a maximum dimension D of each of the openings of the cavity is less than or equal to a central wavelength Lc of the electromagnetic transmission wave E;

a maximum dimension D of each of the openings of the cavity is substantially less than a maximum wavelength Lm of the electromagnetic transmission wave F in the cavity, preferably close to one half of said maximum wavelength Lm;

the cavity is a three-dimensional cavity substantially closed on itself, and the plurality of openings are arranged so as to cover substantially an entire outer surface of the cavity;

the cavity is a three-dimensional cavity substantially closed on itself, and the plurality of openings are arranged on a planar face of the cavity;

the cavity has a scattering structure capable of generating multiple scattering of the electromagnetic transmission wave F in the cavity;

the plurality of openings comprises more than ten openings, preferably more than a hundred openings;

a center frequency of the electromagnetic transmission wave E is within the microwave frequency range, in particular within one or more of bands L, S, C, X, K, Q, V and K;

the method further comprises a target detection step wherein a desired direction of focus outside the cavity is determined.

The invention also relates to a device for generating high-power electromagnetic radiation, comprising a reverberation cavity having a plurality of openings and in which is arranged at least one transmission antenna of a transmission device capable of emitting, in the cavity, an electromagnetic transmission wave E having an electromagnetic temporal waveform F focused in a desired direction of focus $\theta$ outside the cavity.

In one embodiment of the invention, the device may further comprise a target detection radar for determining a desired direction of focus outside the cavity.

Other features and advantages of the invention will be apparent from the following description of one of its embodiments, given by way of non-limiting example, with reference to the accompanying drawings.

BRIEF DESCRIPTION OF DRAWINGS

In the drawings.

In the various figures, the same references designate identical or similar elements.

MORE DETAILED DESCRIPTION

Figure 1:
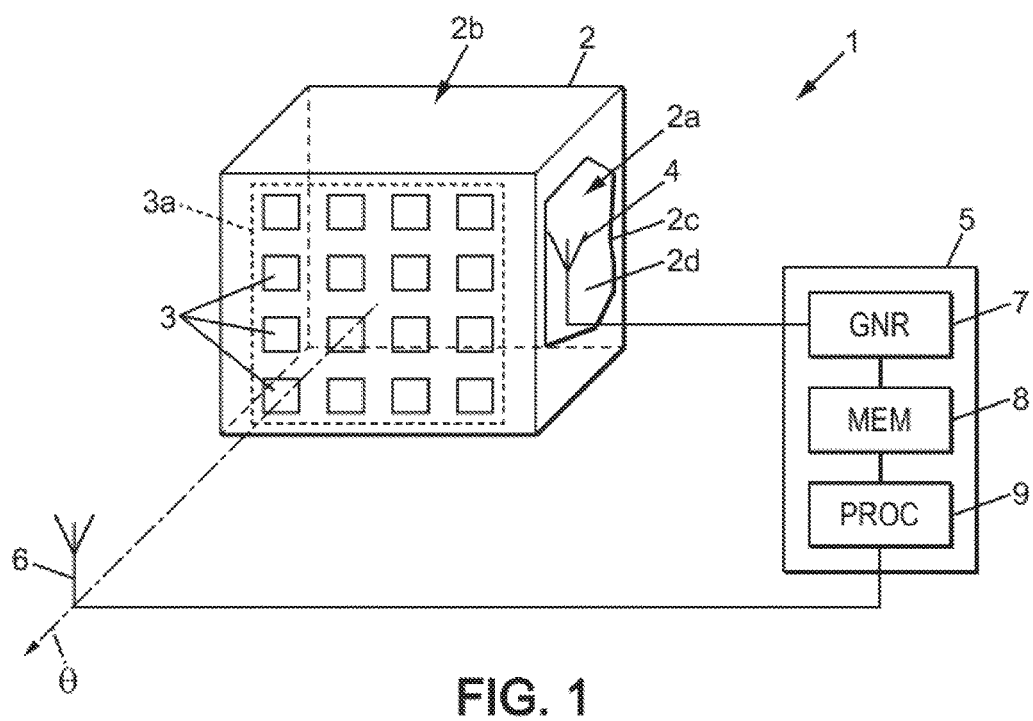
FIG. 1 is a schematic view of a device for generating high-power electromagnetic radiation according to an embodiment of the invention.

FIG. 1 illustrates a device 1 for generating high-power electromagnetic radiation according to one embodiment of the invention.

The device 1 firstly comprises a cavity 2, in particular a reverberation cavity. The cavity is a three-dimensional cavity, substantially closed on itself except for a plurality of openings 3. The openings 3 are in particular reduced dimensions as will be further detailed below.

The cavity 2 thus has an inner surface 2a and an outer surface 2b, a wall 2c extending between them separating the cavity 2 from the outside.

The inner surface 2a of the cavity 2 thus defines an interior space 2d of the cavity 2. The interior space 2d may be an empty space, filled with a fluid such as air or water, or filled with a material, in particular filled with a dielectric. Such a dielectric serves to control the wavelength of the electromagnetic radiation in the cavity and to reduce the dimensions of the cavity 2.

"Reverberation cavity" is understood in particular to mean a cavity whose inner surface is capable of reflecting electromagnetic radiation propagating in the interior space of the cavity for at least one electromagnetic frequency of interest of said radiation. It thus means a cavity whose inner surface has a reflection coefficient for the electromagnetic frequency of interest that is sufficiently high to reflect an electromagnetic pulse propagating a large number of times in the interior space of the cavity on its inner surface, example several tens of times or several hundred times, or even several thousand times.

The electromagnetic frequency of interest may be any electromagnetic wave frequency but may advantageously be within the microwave frequency range, in particular within or more of bands L, S, C, X, K, Q, V and W.

In a purely illustrative and non-limiting exemplary embodiment, an electromagnetic frequency of interest may be a frequency of several gigahertz, for example 2 GHz.

The cavity 2 thus has a high decay time, also commonly referred to as "reverberation time", compared with the duration of an electromagnetic pulse emitted in the cavity. "Decay time" is understood to mean a period during which the total energy of said electromagnetic pulse emitted in the cavity is divided by Euler's number.

The attenuation of the electromagnetic wave partly due to the skin effect on the inner surface 2a of the cavity 2. The inner surface of the cavity 2 may therefore be metal, to reduce said attenuation.

Of course, the attenuation of the electromagnetic wave is also partly due to losses via radiation out of the cavity, as the purpose of the device and method is to generate an electromagnetic wave of high intensity. Advantageously, the inner surface of the cavity is selected so that the attenuation due to the skin effect is less than the attenuation due to radiation out of the cavity.

In one exemplary embodiment, provided for purely illustrative and non limiting purposes, the cavity 2 may comprise an inner surface 2a of galvanized steel coated with aluminum.

The cavity 2 may have varying dimensions. "Dimensions of the cavity" is understood to mean the dimensions of the interior space 2d of the cavity 2.

Again according to an embodiment provided as a purely illustrative and non-limiting example, the cavity 2 may have a length of 1.8 meters, a width of 1.24 meters, and a height of 1.1 meters.

The cavity 2 further comprises a plurality of openings 3. The openings 3 are through-openings in the wall 2c, thus connecting the inner surface 2a and the outer surface 2b of the cavity 2.

Advantageously, the cavity 2 has a large number of openings 3, for example more than ten openings, or even more than a hundred openings.

The openings 3 are arranged so as to cover substantially all of a transmission surface 3a of the cavity 2.

The apertures 3 may be arranged regularly on the transmission surface 3a, or may be arranged randomly.

In one embodiment, the transmission surface 3a may correspond to substantially all of the outer surface 2b of the cavity 2. The transmission surface 3a can thus be a three-dimensional surface and in particular the outer three-dimensional surface 2b of the cavity 2.

"Three-dimensional surface" is understood to mean that the transmission surface is not flat but has volume. This means in particular that the openings 3 are not arranged in a single plane in the space but in several non-coincident planes, for example in two perpendicular planes. In this manner, the electromagnetic wave can be emitted in a large number of directions in the space and be focused over a wide spatial angle.

In one embodiment, the transmission surface 3a may be only a portion of the outer surface 2b of the cavity 2.

The transmission surface 3a may thus be a flat face 3a of the outer surface 2b of the cavity 2. The cavity 2 may be for example a parallelepiped and the flat face 3a may be one side of said parallelepiped.

The openings 3 may have an arbitrary general shape, for example a square, oval, polygonal, or t shape, or generally any other closed geometric shape.

The openings 3 thus allow partial emission to outside the cavity 2, of the electromagnetic waves present in the interior space 2d of the cavity 2.

The openings 3 thus reduce the decay time of the cavity 2 and their maximum dimensions can advantageously be reduced and in particular be less than a predefined size that will be detailed below, in order to maintain a high decay time in the cavity 2 and a large number of reflections of the electromagnetic waves present in the interior space 2d.

At least one transmission antenna 4 of transmission device 6 is arranged in the cavity 2, in other words at least partially within the interior space 2d of the cavity 2.

The transmission device 5 is capable of emitting in the cavity 2 an electromagnetic transmission wave F with a predefined and adjustable temporal waveform F.

The transmission device 5 may thus include an arbitrary waveform generator 7 capable of generating a wave with at least one predefined temporal waveform F, and memory 8 capable of storing at least one temporal waveform F.

The transmission antenna 4 may be an omnidirectional antenna or a directional antenna.

For example, in one embodiment of the invention, the transmission antenna 4 may be a directional antenna having a certain cone of transmission. The transmission antenna 4 can then advantageously be arranged in the cavity 2 so that there is no straight path which extends in the direction of focus θ, which ides within the cone of transmission, and which passes through an opening 3 of the cavity 2 without encountering any obstacle between the transmission antenna 4 and the outside of the cavity 2, meaning without scattering in the cavity 2. Such an antenna arrangement ensures that all the electromagnetic radiation emitted by the transmission antenna 4 is scattered at least once by the inner surface 2a of the cavity 2.

In an alternative embodiment, multiple transmission antennas 4 may be arranged in the cavity 2 and controlled by one or more arbitrary waveform generators 7 of the transmission device 5.

Said multiple transmission antennas 4 can emit electromagnetic waves E of identical temporal waveforms. Alternatively, the transmission antennas 4 can respectively emit different respective electromagnetic waves of respective temporal waveforms $F_k$, and in particular electromagnetic waves E of respective different passbands $B_k$ and/or central frequencies $Fc_k$.

In one embodiment of the invention, the cavity 2 further comprises a scattering structure arranged in the interior space 2d of the cavity 2. The scattering structure may be capable of generating multiple scattering of the electromagnetic transmission wave E in the cavity 2, so as to further scatter the electromagnetic transmission wave E in the cavity 2.

The electromagnetic transmission wave E advantageously has a non-zero intensity at the electromagnetic frequency of interest described above, so that the electromagnetic transmission wave E is adapted for reflection multiple times in the cavity 2.

By way of non-limiting example, the electromagnetic transmission wave F can thus have a center frequency in the cavity 2 of a few gigahertz, for example 2 GHz.

Advantageously, a maximum dimension D of each of the openings 3 of the cavity 2 is less than or equal to a central wavelength Lc of the electromagnetic transmission wave E in the cavity 2.

The central wavelength Lc of the electromagnetic transmission wave E in the cavity 2 is dependent on the center frequency Fc of the electromagnetic transmission wave F and the physical characteristics of the interior space 2d of the cavity 2.

In one particular embodiment of the invention, the maximum dimension D of each of the openings 3 formed in the cavity 2 is substantially less than a maximum wavelength Lm of the electromagnetic transmission wave E in the cavity 2.

Preferably, the maximum dimension D of each of the openings 3 of the cavity 2 may be close to half of said maximum wavelength Lm.

In this manner, a portion of the electromagnetic transmission wave E can be emitted outwardly from the cavity through the openings 3, while maintaining a high decay time in the cavity 2, for example more than a thousand times the duration of the electromagnetic transmission wave E.

A method of generating high-power electromagnetic radiation according to an embodiment of the invention may then comprise the following steps.

In a first step of calibration, an electromagnetic temporal waveform F focused in a desired direction of focus θ outside the cavity 2 is determined.

The desired direction of focus θ is a direction of focus θ defined relative to the cavity 2, for example defined relative to the transmission surface 3a.

To determine the temporal waveform F, the following operations may be implemented.

Firstly, a receiving antenna 6 is provided outside the cavity 2 in the desired direction of focus θ. For example, a receiving antenna 6 may be provided at a distance from the cavity 2 such that said receiving antenna 6 is located in the far field of the cavity 2.

Next, an electromagnetic calibration wave C is emitted in the cavity 2 by means of the transmission device 5.

The electromagnetic calibration wave r may for example have a center frequency close to the electromagnetic frequency of interest described above, so that the electromagnetic calibration wave C is able to be reflected multiple times in the cavity 2.

By way of non-limiting example, the electromagnetic calibration wave C may have a center frequency in the cavity 2 of a few gigahertz, for example 2 GHz.

The electromagnetic calibration wave C is a wideband electromagnetic wave.

For example, the electromagnetic calibration wave C may have a passband width greater than the inverse of the decay time in the cavity 2. Preferably, the passband width of the electromagnetic calibration wave C may be greater than twice the inverse of said decay time.

The electromagnetic calibration wave C may thus have a large passband, for example a passband of 50 to 100 percent of the center frequency of the calibration wave C.

In a second operation, a time series S of electrical signal values representative of the electromagnetic field generated by the electromagnetic calibration wave C at the location of the receiving antenna 6 is acquired by means of the receiving antenna 6.

Figure 2A:
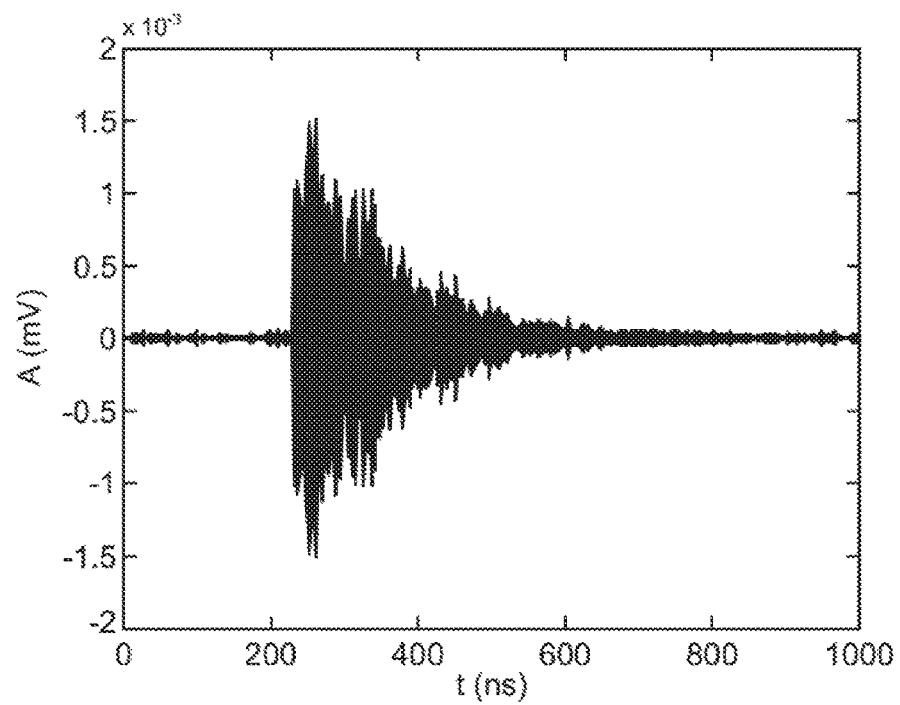
FIG. 2A is a graph illustrating a time series of electrical signal values representative of the electromagnetic field generated by an electromagnetic calibration wave at the location of a receiving antenna of a device for generating high-power electromagnetic radiation according to an embodiment of the invention.

Such a time series S is illustrated in FIG. 2A.

Due to the reverberation of the electromagnetic calibration wave C in the cavity 2, the time series S representative of the electromagnetic field at the location of the receiving antenna 6 has a duration that is hundreds to thousands of times the duration of the electromagnetic calibration wave C.

"Duration of the time series" is understood to mean in particular the length of time during which the values of the time series are greater than a given noise level.

In a third operation, the electromagnetic temporal waveform F is determined from said time series S.

This may be carried out by a processing unit 9 which may be part of the transmission device 5, as illustrated in FIG. 1, or may be a unit physically separate from said transmission device 5.

The electromagnetic temporal waveform F is, for example, a time series of phase values of the electromagnetic wave and/or a time series of amplitude values of the electromagnetic wave.

To determine said temporal waveform F, a time-reversal method may be implemented for example.

The temporal waveform F may thus correspond for example to the time-reversed time series S, in other words the series in reverse chronology.

The duration of the temporal waveform F can thus be close to the duration of the time series S.

Alternatively, a baseband time reversal method may be implemented. Thus, a temporal waveform F is determined for example such that the phase of said temporal waveform F corresponds to the phase of the time-reversed time series while the amplitude of said temporal waveform F is constant, or normalized, for the entire duration of the temporal waveform F.

According to another variant, a temporal waveform F may be determined by implementing a 1-bit time reversal method. In this case, the temporal waveform F can correspond to a time reversal of the time series S while only retaining information concerning the sign of the time series S. The temporal waveform F is thus given for example by $$F(t) = \begin{cases} 1 & \text{if } S(T-t) \geq 0 \\ -1 & \text{if } S(T-t) < 0 \end{cases}$$

where T is the duration of the time series S.

Other variants of this operation are of course possible, and it is understood that they take advantage of the principle of time reversal of the time series S while retaining more or less information concerning said time series S.

Once the temporal waveform F is determined, the method of the invention then comprises a step in which an electromagnetic transmission wave F having temporal waveform F is emitted in the cavity 2. The electromagnetic transmission wave E may be emitted by means of the transmission device 5.

Figure 2B:
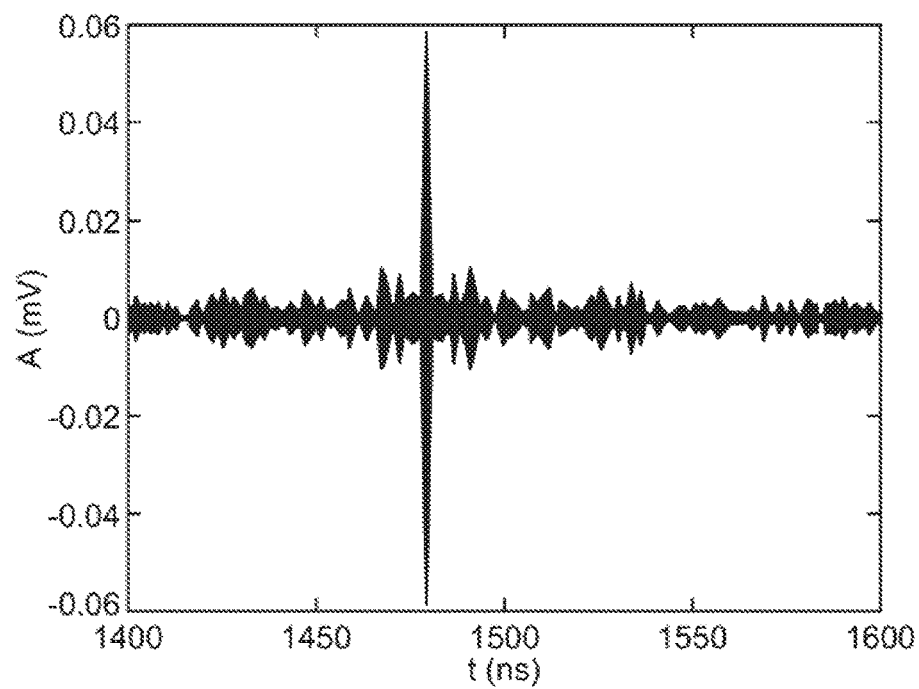
FIG. 2B is a graph illustrating the electromagnetic field generated by an electromagnetic transmission wave at a point outside the cavity during implementation of a method for generating high-power electromagnetic radiation according to an embodiment of the invention.

The electromagnetic field generated by such an electromagnetic transmission wave E at a point outside the cavity in the direction of focus θ is, for example, illustrated in FIG. 2B.

As the electromagnetic transmission wave E corresponds to the time reversal of the calibration signal, it undergoes high spatial and temporal compression in the cavity 2. All frequencies within the passband of the electromagnetic transmission wave E are thus summed in a consistent manner outside the cavity in the direction of focus θ, and the electromagnetic transmission wave E generates a high-amplitude wave outside the cavity focused in the desired direction of focus θ.

Furthermore, the size of the transmission surface 3a, taken perpendicularly to the direction of focus θ, can be less than a maximum dimension L.

The width of the focal zone of the wave H outside the cavity, at a point located at a distance d from the cavity 2 in the direction of focus θ, can thus be on the order of $$\lambda d/L$$

where λ is the wavelength of the external wave H.

"Size of the transmission surface taken perpendicularly to the direction of focus" is understood to mean a maximum distance between points of the transmission surface, said distance being measured perpendicularly to the direction of focus.

In one embodiment of the method according to the invention, a plurality of electromagnetic temporal waveforms $F_i$ respectively focused in a plurality of desired directions of focus $\theta_i$ outside the cavity are determined.

In this manner, by emitting in the cavity 2, by means of the transmission device 5, an electromagnetic transmission wave F having temporal waveform $F_i$, one can obtain an electromagnetic transmission wave E focused in the associated direction of focus $\theta_i$.

One will note that the step of determining an electromagnetic temporal waveform F may be carried out once and for all during calibration of the apparatus, while the step of emitting the electromagnetic transmission wave E having temporal waveform F may be carried out many times, if necessary with various temporal waveforms $F_i$ in order to focus in various directions of focus $\theta_i$.

Note also that once the temporal waveform (s) $F_i$ is/are determined, it is possible when necessary to disconnect the receiving antenna 6, and where appropriate the processing unit 9, and to remove them from the device 1.

In this manner, the device 1 can be lighter during operation.

Furthermore, the method according to the invention may further comprise a target detection step, during which a desired direction of focus outside the cavity is determined.

For this purpose, a direction and/or position of a target outside the cavity may be detected.

Such a target is, for example, an object in the direction, or at the location, where generating an electromagnetic transmission wave is desired.

To this end, the device 1 for generating high-power electromagnetic radiation may comprise a target detection radar. The target detection step can then be carried out by making use of said radar. Said radar may be any radar commonly used for detecting a moving or stationary target.

The radar may be in the form of a system independent of the cavity 2, or may be incorporated in the cavity 2.

The invention claimed is:

1. A method for generating high-power electromagnetic radiation, wherein
   a reverberation cavity is provided having a plurality of openings and in which is arranged at least one transmission antenna of a transmission device capable of emitting an electromagnetic transmission wave E having a predefined and adjustable temporal waveform F, said plurality of openings being adapted to allow partial emission to outside the reverberation cavity of electromagnetic waves present in an interior space of the reverberation cavity,
   the temporal waveform F is configured for obtaining a generated electromagnetic wave outside the reverberation cavity focused in a desired direction of focus and is determined by the sub steps of:
   providing a receiving antenna outside the reverberation cavity in the desired direction of focus,
   emitting a wideband electromagnetic calibration wave C in the reverberation cavity by means of the transmission device,
   acquiring a time series S of electrical signal values representative of the electromagnetic field generated by the electromagnetic calibration wave C at the location of the receiving antenna, using the receiving antenna, and
   determining the electromagnetic temporal waveform F from said time series S by applying a time reversal method,
   an electromagnetic transmission wave E having said temporal waveform F is emitted in the cavity by means of the transmission device.

2. The method according to claim 1, wherein the electromagnetic calibration wave C has a passband width greater than the inverse of a decay time in the cavity, preferably greater than twice the inverse of said decay time.

3. The method according to claim 1, wherein the electromagnetic temporal waveform F comprises elements selected from the electromagnetic wave phase values and one of the electromagnetic wave amplitude values.

4. The method according to claim 1, wherein a plurality of temporal waveforms $F_i$ respectively corresponding to a generated electromagnetic wave outside the cavity focused in a plurality of directions of focus $\theta_i$ are determined.

5. The method according to claim 1, wherein a maximum dimension D of each of the openings of the cavity is less than or equal to a central wavelength Lc of the electromagnetic transmission wave E.

6. The method according to claim 1, wherein a maximum dimension D of each of the openings of the cavity is substantially less than a maximum wavelength Lm of the electromagnetic transmission wave E in the cavity, preferably close to one half of said maximum wavelength Lm.

7. The method according to claim 1, wherein the cavity is a three-dimensional cavity substantially closed on itself, and wherein the plurality of openings are arranged so as to cover substantially an entire outer surface of the cavity.

8. The method according to claim 1, wherein the cavity is a three-dimensional cavity substantially closed on itself, and wherein the plurality of openings are arranged on a planar face of the cavity.

9. The method according to claim 1, wherein the cavity has a scattering structure capable of generating multiple scattering of the electromagnetic transmission wave E in the cavity.

10. The method according to claim 1, wherein the plurality of openings comprises more than ten openings, preferably more than a hundred openings.

11. The method according to claim 1, wherein a center frequency of the electromagnetic transmission wave E is within the microwave frequency range, in particular within one or more of bands L, S, C, X, K, Q, V and W.

12. The method according to claim 1, further comprising a target detection step wherein a desired direction of focus outside the cavity is determined.

13. A device for generating high-power electromagnetic radiation, comprising a reverberation cavity having a plurality of openings and in which is arranged at least one transmission antenna of a transmission device capable of emitting, in the cavity, an electromagnetic transmission wave E having an electromagnetic temporal waveform F focused in a desired direction of focus θ outside the cavity.

14. The device according to claim 13, further comprising a target detection radar for determining a desired direction of focus outside the cavity.

15. A method for generating high-power electromagnetic radiation, comprising:
   a calibration step comprising:
      emitting a wideband electromagnetic calibration wave C using a transmission device disposed within a reverberation cavity having a plurality of openings, the transmission device having at least one transmission antenna, wherein the plurality of openings are adapted to allow partial emission of electromagnetic waves present in an interior space of the reverberation cavity to outside the reverberation cavity;
      acquiring, using a receiving antenna, a time series S of electrical signal values representative of the electromagnetic field generated by the electromagnetic calibration wave C at a location of the receiving antenna, the receiving antenna being disposed outside of the reverberation cavity in a desired direction of focus; and
      determining an electromagnetic temporal waveform F from the time series S by applying a time reversal method; and
   emitting from the at least one transmission antenna an electromagnetic transmission wave E having the temporal waveform F.

* * * * *